United States Patent
Kato

(10) Patent No.: US 7,852,357 B2
(45) Date of Patent: Dec. 14, 2010

(54) DISPLAY APPARATUS, DISPLAY METHOD, DISPLAY PROGRAM, AND RECORDING MEDIUM WITH THE DISPLAY PROGRAM FOR CONTROLLING DISPLAY OF AT LEAST A PORTION OF A MAP

(75) Inventor: Ryoichi Kato, Tokyo (JP)

(73) Assignee: Sony Corporation (JP)

( * ) Notice: Subject to any disclaimer, the term of this patent is extended or adjusted under 35 U.S.C. 154(b) by 544 days.

(21) Appl. No.: 11/283,923

(22) Filed: Nov. 21, 2005

(65) Prior Publication Data

US 2006/0112350 A1    May 25, 2006

(30) Foreign Application Priority Data

Nov. 22, 2004    (JP) .............................. 2004-337009

(51) Int. Cl.
*G09G 5/00* (2006.01)
(52) U.S. Cl. ...................... 345/660; 345/619; 345/661; 345/665; 345/666; 345/667; 345/672; 345/681; 345/682; 345/684; 715/788; 715/800; 701/211; 701/212; 701/214
(58) Field of Classification Search .................. 345/619
See application file for complete search history.

(56) References Cited

U.S. PATENT DOCUMENTS

| | | | |
|---|---|---|---|
| 5,289,168 A * | 2/1994 | Freeman ...................... | 345/672 |
| 5,612,881 A | 3/1997 | Moroto et al. | |
| 5,787,382 A | 7/1998 | Kurabayashi et al. | |
| 6,202,026 B1 | 3/2001 | Nimura et al. | |
| 6,407,749 B1 | 6/2002 | Duke | |
| 6,484,094 B1 | 11/2002 | Wako | |
| 6,587,787 B1 | 7/2003 | Yokota | |
| 6,747,680 B1 * | 6/2004 | Igarashi et al. ............... | 715/784 |

(Continued)

FOREIGN PATENT DOCUMENTS

JP    3-185496 A    8/1991

(Continued)

OTHER PUBLICATIONS

Office Action from Japanese Application No. 2004-337009, dated May 11, 2010.

*Primary Examiner*—Alvin H Tan
(74) *Attorney, Agent, or Firm*—Lerner, David, Littenberg, Krumholz & Mentlik, LLP

(57) ABSTRACT

The present invention provides a display apparatus for zooming and displaying a portion of an object to be displayed on display means according to an instruction by a user and allowing scrolling a display portion for the object to be displayed. The display apparatus includes input means for accepting the instruction by a user, and control means for controlling a display of the object to be displayed on the display means so that zooming out of the display on the display means is started and then the zoomed out display is zoomed in to the original size according to the instruction by a user as a trigger. The control means stops the zooming out or zooming in the display when scrolling is instructed by the input means during a period from a point of time when the zooming out is started until a point of time when the zooming in is completed, and scrolls the display on the display means according to the instruction for scrolling.

11 Claims, 8 Drawing Sheets

U.S. PATENT DOCUMENTS

| | | | |
|---|---|---|---|
| 6,943,811 B2 * | 9/2005 | Matthews | 345/660 |
| 7,133,054 B2 | 11/2006 | Aguera y Arcas | |
| 7,385,615 B2 | 6/2008 | Vale et al. | |
| 2004/0233222 A1 * | 11/2004 | Lee et al. | 345/621 |
| 2005/0046615 A1 | 3/2005 | Han | |
| 2005/0068342 A1 * | 3/2005 | Ouchi et al. | 345/684 |
| 2008/0288166 A1 * | 11/2008 | Onishi et al. | 701/209 |

FOREIGN PATENT DOCUMENTS

| | | |
|---|---|---|
| JP | 5-323872 A | 12/1993 |
| JP | 07280577 A | 10/1995 |
| JP | 8-069515 A | 3/1996 |
| JP | 09050235 A | 2/1997 |
| JP | 10133642 A | 5/1998 |
| JP | 10268759 A | 10/1998 |
| JP | 11327433 A | 11/1999 |
| JP | 2000-292194 A | 10/2000 |
| JP | 2001-021373 A | 1/2001 |
| JP | 2002081942 A | 3/2002 |

* cited by examiner

DISPLAY APPARATUS, DISPLAY METHOD, DISPLAY PROGRAM, AND RECORDING MEDIUM WITH THE DISPLAY PROGRAM FOR CONTROLLING DISPLAY OF AT LEAST A PORTION OF A MAP

CROSS-REFERENCES TO RELATED APPLICATIONS

The present invention contains subject matter related to Japanese Patent Application JP 2004-337009 filed in the Japanese Patent Office on Nov. 22, 2004, the entire contents of which being incorporated herein by reference.

BACKGROUND OF THE INVENTION

The present invention relates to a display apparatus, a display method, a display program, and a recording medium with the display program recorded therein, and can be applied to, for instance, a car navigation apparatus. The present invention enables confirmation of facilities and the like in an area around a displayed place with simple operations by temporally zooming out a display to provide the display with the original size in response to an instruction by a user as a trigger and also by allowing scroll operations by the user during the process above.

A car navigation apparatus is used for guiding a user to a destination by displaying a map. In the car navigation system as described above, it is possible to change a scale of a map display in response to a user's operation and also to scroll the display.

Various types of devices have been proposed in relation to the map display as described above, and for instance, Japanese Patent Laid-open No. 2000-292194 proposes a method of facilitating operations for scrolling by switching a scrolling speed in response to a user's operation.

In the state where a map for a current position is being displayed on the car navigation system, sometimes a user wants to confirm an area around the current position or to grasp a positional relation between the current position and peripheral facilities such as the nearest highway, stations, public facilities, and the like. In the case as described above, when a desired position is not display on a map for the current position, the user once scales down the current map display to confirm the desired position, and then restores the map with the previous scale.

Further in the case as described above, if a user wants to confirm a desired position with a more detailed map display, the user scales down the map display once so that the desired position is displayed, scrolls the map display so that the desired position is displayed at the center of the screen, scales up the map display in the state, and then has the current position again displayed on the map with the previous scale.

Therefore, with the type of car navigation system in related art, the user is disadvantageously required to repeat cumbersome operations for confirming facilities and the like in an area around a place currently being displayed.

SUMMARY OF THE INVENTION

The present invention was made in the light of the circumstances as described above, and it is desirable to provide a display apparatus, a display method, a display program, and a recording medium with the display program recorded therein enabling confirmation of facilities and the like in an area around a place being displaced with simple operations.

To solve the problems as described above, according to an embodiment of the present invention, a display apparatus includes input means for accepting an instruction by a user, and control means for controlling a display of the object to be displayed on the display means so that zooming out of the display on the display means is started and then the zoomed out display is zoomed in to the original size according to the instruction by a user as a trigger. The control means stops the zooming out or zooming in the display when scrolling is instructed by the input means during a period from a point of time when the zooming out is started until a point of time when the zooming in is completed, and scrolls the display on the display means according to the instruction for scrolling.

According to an embodiment of the present invention, the display method includes the steps of zooming in, after starting zooming out a display on the display means according to the user's instruction as a trigger, the display to the original size, and scrolling, during a period from a point of time when the zooming out is started until a point of time when the zooming in is finished by stopping the zooming out and zooming in the display when an instruction for scrolling is inputted by the user, the display on the display means according to the instruction for scrolling.

According to an embodiment of the present invention, a recording medium with a program for the display method recorded therein, includes the steps of zooming in, after starting zooming out a display on the display means according to the user's instruction as a trigger, the display to the original size, and scrolling, during a period from a point of time when the processing for zooming out is started until a point of time when the processing for zooming in is finished by stopping the zooming out and zooming in the display when scrolling is instructed by the user, the display on the display means according to the instruction for scrolling.

According to an embodiment of the present invention, a display apparatus includes an input section for accepting the instruction by a user, and a control section for controlling a display of the object to be displayed on the display section so that zooming out of the display on the display section is started and then the zoomed out display is zoomed in to the original size according to the instruction by a user as a trigger. The control section stops the zooming out or zooming in a display when scrolling is instructed by the input section during a period from a point of time when the zooming out is started until a point of time when the zooming in is completed, and scrolls the display on the display section according to the instruction for scrolling.

With the configuration according to an embodiment of the present invention, because of the features, a user can confirm, for instance, peripheral facilities in a larger area around a current place simply by giving a trigger via input means. Further by instructing scrolling according to the necessity, even a remote site far from a point currently being displayed can be confirmed with simple operations.

Because of the features as described above, with the configuration according to an embodiment of the present invention, it is possible to provide a display method, a program for the display method, and a recording medium with the program for the display method recorded therein enabling confirmation of facilities and the like in an area around a place currently being displayed with simple operations.

BRIEF DESCRIPTION OF THE DRAWINGS

FIG. 7 is a characteristic curve diagram illustrating a case where scrolling is instructed when zooming in;

DETAILED DESCRIPTION

First Embodiment

(1) Configuration According to an Embodiment

Figure 2:
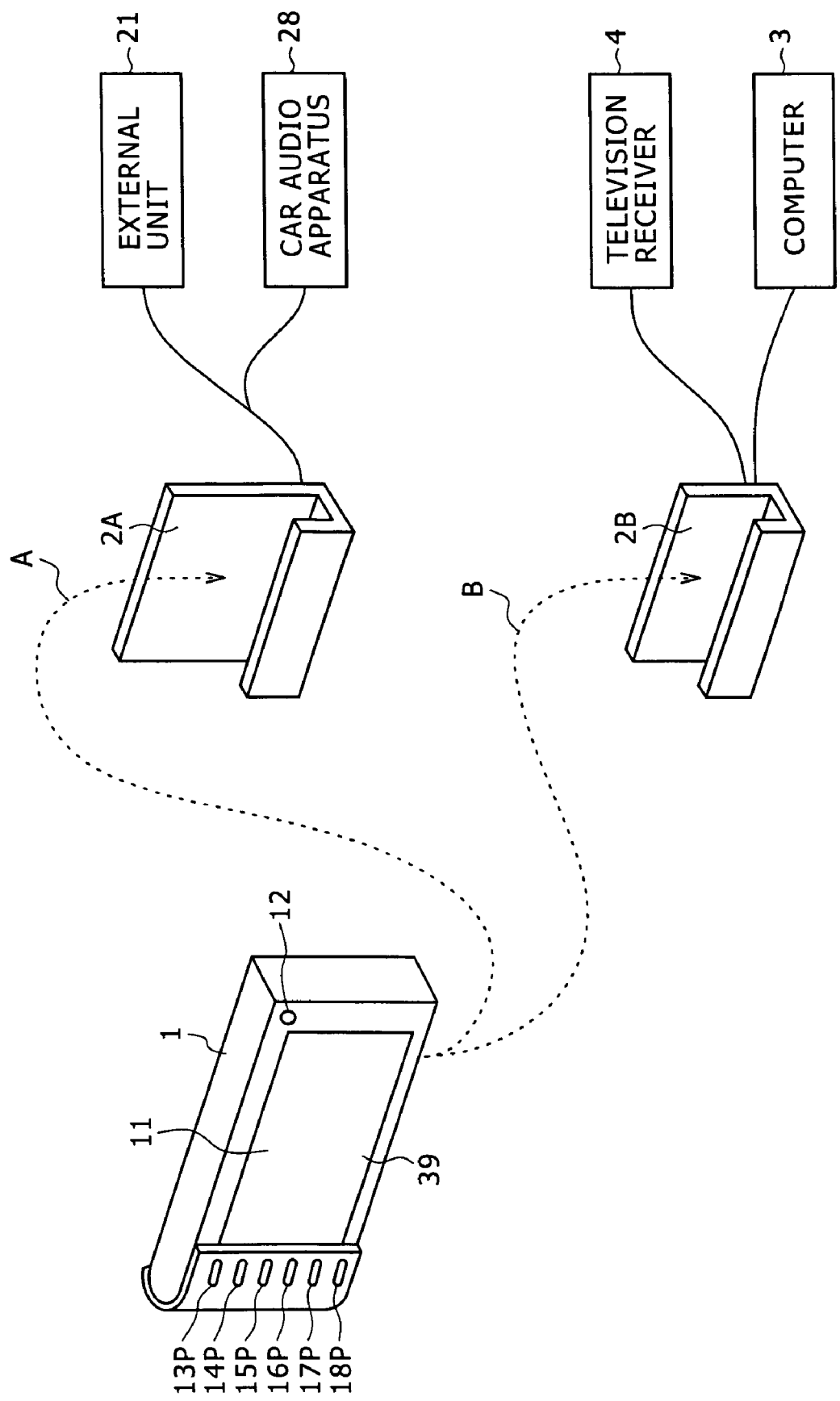
FIG. 2 is a simplified diagram showing system configuration of the car navigation apparatus according to the embodiment of the present invention.

FIG. 2 is a perspective view showing a car navigation system for a car navigation system 1 according to an embodiment of the present invention. This car navigation apparatus 1 is a multi-media terminal having functions of a contents-providing apparatus for reproducing audio and video data in addition to functions of an ordinary car navigation system has a plate-like form with a prespecified thickness, and is set for use in an in-vehicle cradle 2A provided in a center console of a vehicle as indicated by an arrow mark A.

In this car navigation apparatus 1, terminals and the like for inputting and outputting various types of data are provided on a lower edge face thereof, and when the car navigation apparatus 1 is set on the in-vehicle cradle 2A, the car navigation apparatus 1 is connected to the in-vehicle cradle 2A via the terminals on the lower edge face, and, for instance, receives power, and further inputs and outputs various types of data and the like required for operations thereof.

This car navigation system 1 can be removed from the in-vehicle cradle 2A, carried back home and set on, for instance, an in-house cradle 2B provided in a house as shown by an arrow mark B, and connected to a computer 3 or a television receiver 4 via the in-house cradle 2B.

The car navigation apparatus 1 is used, when connected to a computer 3 via the in-house cradle 2B as described above, for uploading or downloading various types of files required for operations as a multi-media terminal. For this purpose, the computer 3 can upload a prespecified file stored in the computer 3 to the car navigation apparatus 1 via the in-hose cradle 2B, or download a prespecified file from the car navigation apparatus 1 in response to activation of an application program for the car navigation apparatus 1. In this car navigation apparatus 1, the files uploaded or downloaded as described above include files for AV contents, electronic mails, and map files for navigation, and further the files for AV contents include files for movies, television programs, and those for music pieces.

When the car navigation apparatus 1 is connected via the in-house cradle 2B to the television receiver 4, the car navigation apparatus 1 can provide, as a multi-media terminal, various types of contents to the user, and further can have a map displayed on the television receiver 4 to execute processing such as search for a desired route relating to the navigation function.

To execute the processing as described above, a display screen 11 for displaying contents and the like thereon when loaded in a vehicle is provided on a front face thereof, and further a touch panel 39 is provided on this display screen 11 for detecting an operation by a user. Further a power switch 12 is provided on the right upper side of the display screen 11. In addition, on an operation panel arranged on the side opposite to the power switch 12, operating elements 13P to 18P of "Source", "Program", "Menu", "Display", "Map", and "Volume" are provided in the descending order.

Figure 3:
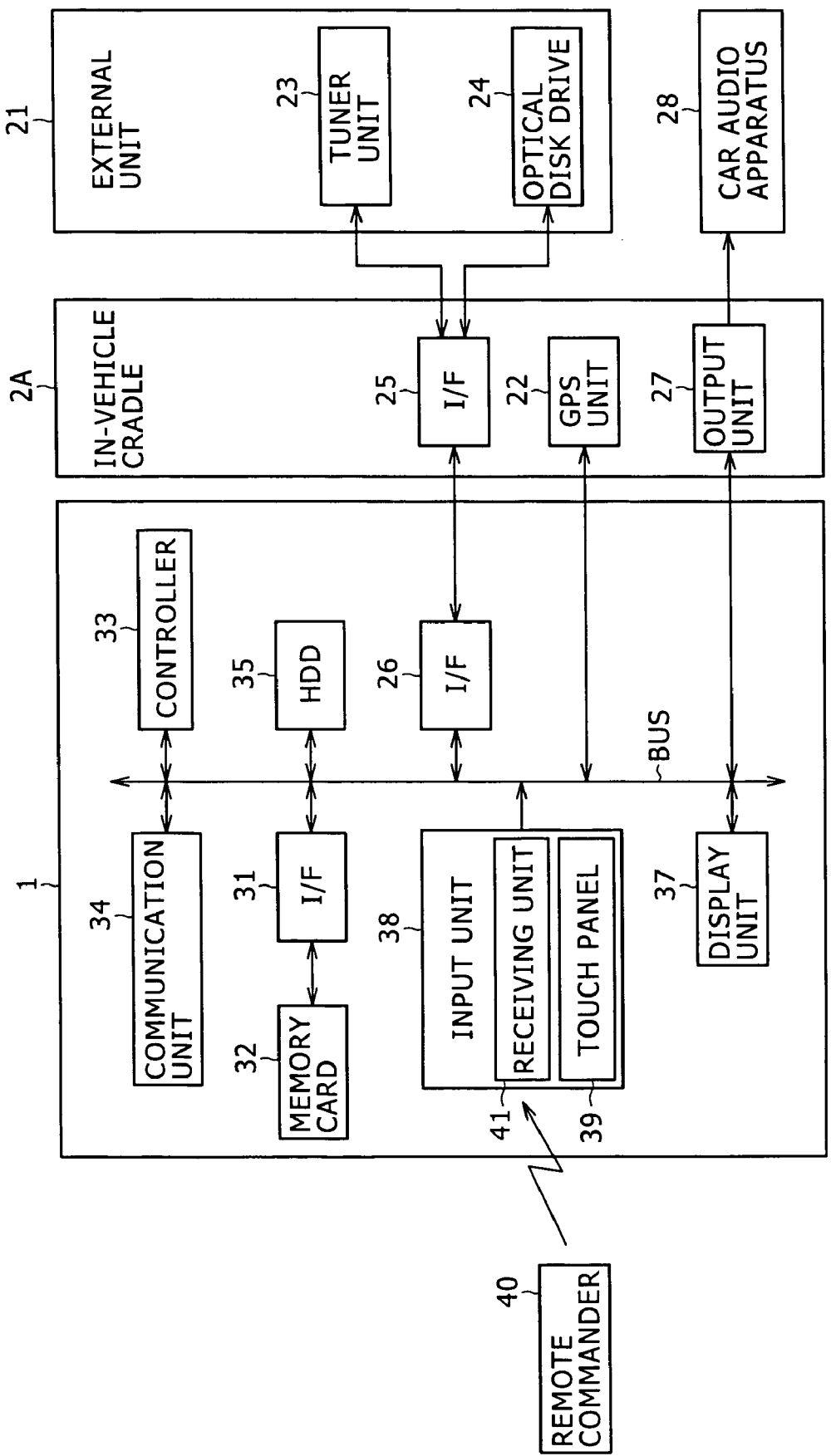
FIG. 3 is a block diagram showing the car navigation apparatus according to the embodiment of the present invention.

FIG. 3 is a block diagram showing the car navigation apparatus 1 together with the related configuration. The car navigation apparatus 1 is connected via the in-vehicle cradle 2A to an external unit 21. The external unit 21 is, for instance, provided under a seat, and such units as a tuner unit 23 and an optical disk drive 24 are provided in the external unit 21.

The tuber unit 23 receives traffic information provided over television broadcast wave or by the Vehicle Information and Communication System (VICS) under controls by the car navigation apparatus 1, and outputs the received video data, audio data, and traffic information to the in-vehicle cradle 2A. With the configuration as described above, the car navigation apparatus 1 can be set in the in-vehicle cradle 2A and used for enjoying television broadcast programs, and further can acquire traffic information and provide the acquired traffic information to the user.

The optical disk drive 24 reproduces data stored in an optical disk such as a DVD (Digital Versatile Disk), a compact disk, and the like and outputs the reproduced audio data and video data to the in-vehicle cradle 2A. With the configuration as described above, the car navigation apparatus 1 can be set in the in-vehicle cradle 2A and used for enjoying AV contents stored in various types of optical disks by means of the AUX input.

The in-vehicle cradle 2A has a GPS unit 22 and an audio data output unit 27 each provided therein. The GPS unit is a current position detecting device based on the GPS (Global Positioning System), and detects a current position and outputs data concerning the detected current position under controls by the car navigation apparatus 1. With this configuration, when set in the in-vehicle cradle 2A, the car navigation apparatus 1 can execute the processing for navigation based on information concerning the current position detected by the GPS unit 22.

The output unit 27 acquires audio data and sound data from the car navigation apparatus 1, converts the data to an analog signal, and outputs the analog signal over FM broadcast wave or via an external output terminal. With the configuration as described above, the car navigation apparatus 1 can output, when set in the in-vehicle cradle 2A, an audio signal and a sound signal to a car audio apparatus 28 with the car navigation apparatus 1 loaded therein, and further outputs the audio signal and sound signal via the car audio apparatus 28.

Also another output unit as described above is provided in the in-house cradle 2B, and the output unit can output the audio, sound, and video signals through a cable, and therefore the car navigation apparatus 1 can provide, when set in the in-house cradle 2B, various types of AV contents with the television receiver 4.

The car navigation apparatus 1 has an interface 26 provided therein, and is connected, when set in the in-vehicle cradle 2A, to an interface (I/F) 25 in the in-vehicle cradle 2A via the interface 26, and can transact various data for the external unit 21 with the interface 25.

The interface 26 operates under controls by a controller 33, and when the car navigation apparatus 1 is set in the in-vehicle cradle 2A, the car navigation apparatus 1 can input and output various types of data to and from the external unit 21, and also input and output the data transacted as described above to and from a BUS. In contrast, when the car navigation apparatus 1 is set in the in-house cradle 2B, the car navigation apparatus 1 can input and output data uploaded or downloaded with a computer 3.

Further in the car navigation apparatus 1, an interface (I/F) 31 inputs and outputs various types of data to and from a memory card 32 inserted into a card slot provided on a side face of the car navigation apparatus 1, and also inputs and outputs the data to and from the BUS. With the configuration, the car navigation apparatus 1 can acquire a still image acquired, for instance, with an electronic still camera via the memory card 32, and also can record an acquired still image in the memory card 32.

A communication unit 34 is a transceiver used in a radio communication LAN (Local Area Network), and transmits the data outputted to the BUS to the network under controls by the controller 33, or acquires desired data via the network and outputs the data to the BUS. With the configuration, the car navigation apparatus 1 can be connected via the communication unit 34 to the Internet to send and receive electronic mails.

A hard disk device (HDD) 35 records and stores therein programs, contents, and the like processed by the car navigation apparatus 1, and outputs the data to the BUS under controls by the controller 33. Because of the features as described above, the hard disk device 35 stores therein data in various types of files inputted via the interfaces 26, 31 from an external device, various types of data acquired via the communication unit 34, data outputted to the external devices described above, and data relating to electronic mails, and also outputs the data to the BUS according to the necessity. The programs are generally provided in the state where the programs have been installed in the car navigation apparatus 1, but may be downloaded from a recording medium via the interfaces 26, 31 or from a network with the communication unit 34 and recorded in the hard disk device 35. In this case, various types of recording media such as an optical disk, a memory card, and a magnetic tape may be used as the recording medium.

A display unit 37 includes, for instance, a liquid crystal display apparatus forming the display screen 11 described above in relation to FIG. 2, and displays various types of contents and maps under controls by the controller 33.

An input unit 38 detects operations on a touch panel 39 provided on the display screen 11, and includes a receiving unit 41 for receiving a remote control signal outputted from a remote commander 40, and an interface for detecting operations with the operating elements 13P to 18P for sources, programs, and the like, and notifies the user's operations received or detected as described above to the controller 33. With the functional configuration, in the car navigation apparatus 1, operation switching and other operations can be performed by operating the operating elements 13P to 18P provided in the side section of the display screen 11, the touch panel 39 provided on the display screen 11, or by operating the remote commander 40.

Provided on the remote commander 40 are operating elements corresponding to the operating elements 13P to 18P provided on the car navigation apparatus 1 and those for scrolling and other operations for selection of a menu on the display screen 11, and the remote commander 40 outputs a remote control signal based on infrared rays in response to an operation of any of the operating elements.

The controller 33 is a processing unit, and executes processing for navigation in response to user's operations by executing a program recorded in the hard disk device 35 operating in response to operations of the remote commander 40 or the like detected via the input unit 38, and also provides various types of contents to the user. In this embodiment, the programs relating to the processing by the controller 33 are generally provided in the state where the programs have been installed in the car navigation apparatus 1, but the programs may be downloaded from a network such as the Internet, or installed from various types of recording media. Various types of recording media such as an optical disk, a magnetic disk and a memory card may be used as the recording medium for the purpose described above.

When provision of contents is instructed by a user, the controller 33 provides video contents, music contents, and the like obtained from the tuner unit 23, optical disk driver 24, and hard disk device 35 in response to an operation by the user via the display unit 37 and car audio apparatus 28. When access to the Internet is instructed, the controller 33 activates browser software for connection to the Internet with the communication unit 34 to display video data and the like obtained through the communication unit 34 on the display unit 37, and further outputs audio data from the output unit 27. Further when processing for electronic mails is instructed, the controller 33 activates a mailer to display electronic mails stored in the hard disk device 35, or acquires the electronic mails to be displayed as described above via the communication unit 34. Further the controller 33 allows to input of an electronic mail by a user, and transmits the electronic mail via the communication unit 34. When access to a still image is instructed, the controller 33 acquires a still image file to be processed from the memory card 32 or the hard disk device 35, and displays the still image in the still image file on the display section 37.

On the other hand, when display of a map is instructed by a user, the controller 33 acquires information for the current position from the GPS unit 22, and loads map data recorded in the hard disk device 35 based on the information for the current position. Further the controller 33 has a map displayed on the display unit 37 based on the map data loaded as described above. When processing for navigation is instructed by a user, the controller 33 accepts inputs such as data for a destination and the like by the user, acquires information on the current position from the GPS section 22, and executes the processing for searching a route based on the information. The controller 33 outputs various types of information by displaying a map according to an instruction by a user for providing guidance for a route to the user based on the route data detected as described above.

In the state where a map is being displayed as described above, when scrolling of the map display is instructed by a user by operating the remote commander 40 or by operating the touch panel 39, the controller 33 allows scrolling of the map display according to an instruction by the user. An instruction for scrolling by the remote commander 40 is, for instance, by operating a joystick provided on the remote commander 40 or by operating a push operating element for instructing the direction for scrolling. When scrolling is instructed by operating the touch panel 39, operations are performed, for instance, for contacting a position displaced in the direction in which the display is to be scrolled, from the center of the display screen with a finger or the like during a period of time for scrolling, or for sliding a finger or the like contacted to the screen in the direction in which the display is to be scrolled, from the centre thereof and kept the finger or the like contacted to the touch panel 39 during a period of time for scrolling.

When switching of a scale of the map display is instructed by a user, the controller 33 switches a scale of the map display step by step in response to an instruction by the user. An instruction for switching a scale of the map display with the remote commander 40 is performed, for instance, by operating the operating elements for wide area display or for detailed display provided on the remote commander 40. An instruction for switching a scale with the touch panel 39 is performed by displaying a menu for instructing a scale of the map display and then selecting a desired scale on this menu.

Because of the functional configuration as described above, the car navigation apparatus 1 can ensure excellent usability like that provided by the type of car navigation apparatus in related art.

Figure 1:
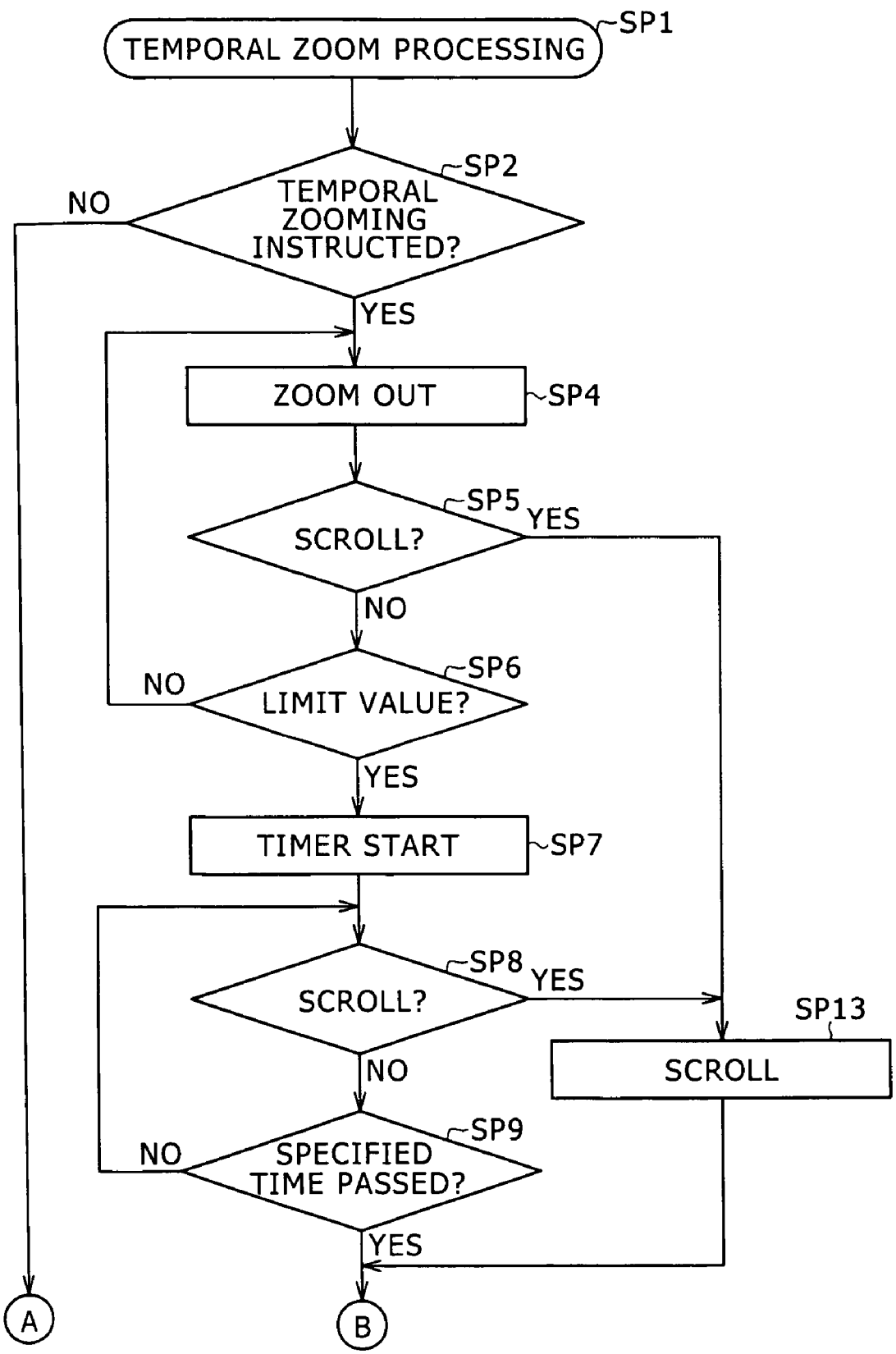
FIG. 1 is a flow chart showing the processing sequence by a controller in a car navigation apparatus according to an embodiment of the present invention.
Figure 4:
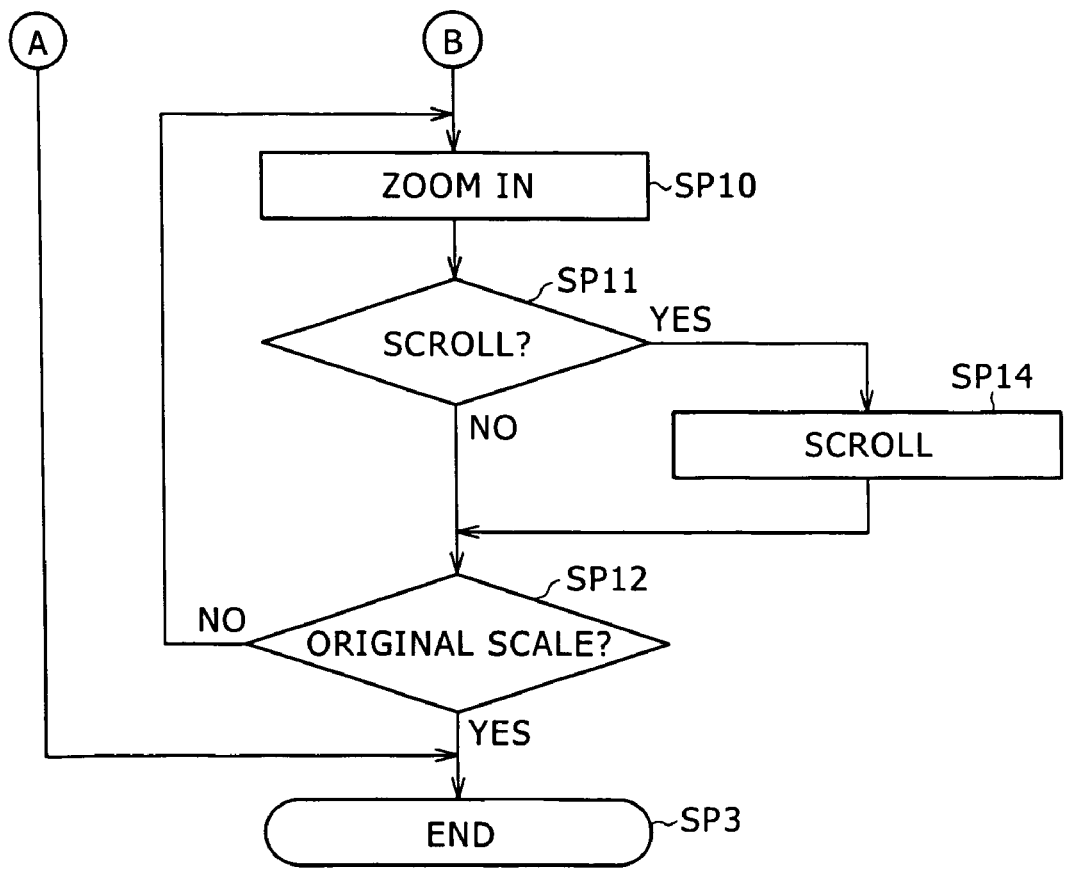
FIG. 4 is a flow chart also showing the car navigation apparatus according to the embodiment of the present invention.

Further, when an instruction for temporally zooming the map display is given by the user, the controller 33 zooms out the map display by executing the processing sequences shown in FIGS. 1 and 4 in response to the instruction for temporally zooming as a trigger to continuously lower a scale of the map display, and then zooms in the map display to the original scale after a prespecified period of time. In this step, when scrolling is instructed by a user, the controller 33 stops the operation for zooming out or for zooming in, scrolls the map display, and then zooms in the map display to the original scale.

The instruction for temporally zooming a map display as described above may be performed, for instance, by pressing a dedicated operating element provided on the remote commander 40, by lightly touching a prespecified area on the touch panel 39, or by inputting a trajectory having a prespecified form with the touch panel 39.

When the processing sequence as described above is started, the controller 33 flows from step SP1 to step SP2, determines whether or not the user's instruction is for temporally zooming the map display. When it is determined in this step that the user's instruction is not for temporally zooming the map display, the controller 33 flows from step SP2 to step SP3 and comletes the processing sequence. When it is determined in step SP2 that the user's instruction is for temporally scrolling the map display, the controller 33 flows from step SP2 to step SP4 to lower a scale of the map display according to a prespecified change rate for zooming out the map display. In the subsequent step SP5, the controller 33 determines whether or not scrolling has been instructed by the user. When it is determined in step SP5 that scrolling has not been instructed by the user, the controller 33 flows to step SP6. In step SP6, the controller 33 determines whether or not a scale for zooming out at the current point of time is a limited value previously set. When it is determined in step SP6 that a scale for zooming out at the current point of time is not a limited value previously set, the controller 33 returns from step SP6 to step SP4. With the functional configuration as described above, once an instruction for temporally zooming out a map display is given by a user, the controller 33 repeats the processing steps SP4, SP5, SP6, and SP4 unless scrolling is instructed by the user, and lowers a scale of the map display to the limit value to zoom out the map display.

A limit value for making a determination in step SP6 as described above is a scale value for a map display when the scale is zoomed out to obtain the maximum value thereof by previously setting the value by a user or by setting a program for this processing sequence. The limit value can be set by multiplying a scale for a map display by a prespecified ratio when zooming out is started.

When a map display is zoomed out and a scale thereof reaches the limit value, processing of the controller 33 flows from step SP6 to step SP7 upon receiving the result in step SP6 that a scale for zooming out at the current point of time is a limit value previously set, starts time measurement by starting a built-in timer, and determines in subsequent step SP8 whether or not scrolling is instructed by a user. When it is determined that scrolling is not instructed by a user, the controller 33 flows to step SP9 and determines whether or not a prespecified period of time has passed using a timer which has started time measurement in step SP7. When it is determined that a prespecified period of time has not yet passed, processing of the controller 33 returns to step SP8. Thus, when a map display is zoomed out and a scale thereof reaches a limit value, the controller 33 repeats the processing sequence in steps SP8, SP9, and SP8 unless scrolling is instructed by the user, and stops zooming out to stand by for passage of a prespecified period of time.

When it is determined in step SP9 that a prespecified period of time has passed as described above, processing of the controller 33 shifts from step SP9 to step SP10 to increase a scale of the map display according to a prespecified change rate for zooming in the map display. It is determined in subsequent step SP11 whether or not scrolling is instructed by a user, and when it is determined that scrolling is not instructed by a user, processing of the controller 33 flows to step SP12. The controller 33 herein determines whether or not the scale for a current map display is the same as the original one, and when it is determined that the scale of a current map display is not the same as the original one, processing of controller 33 returns from step SP12 to step SP 10. Thus the controller 33 zooms out the map display to the scale of a limit value, repeats, after passage of a prespecified period of time, the processing sequence in steps SP10, SP11, SP12, and SP10, and gradually increases the scale of the map display for zooming in until the scale of the map display returns to the original one.

When the scale of the map display returns to the original one by zooming in, it is determined in step SP12 that the scale of the map display is the same as the original one, and processing of the controller 33 shifts from step SP12 to step SP3 to complete this processing sequence.

Figure 5:
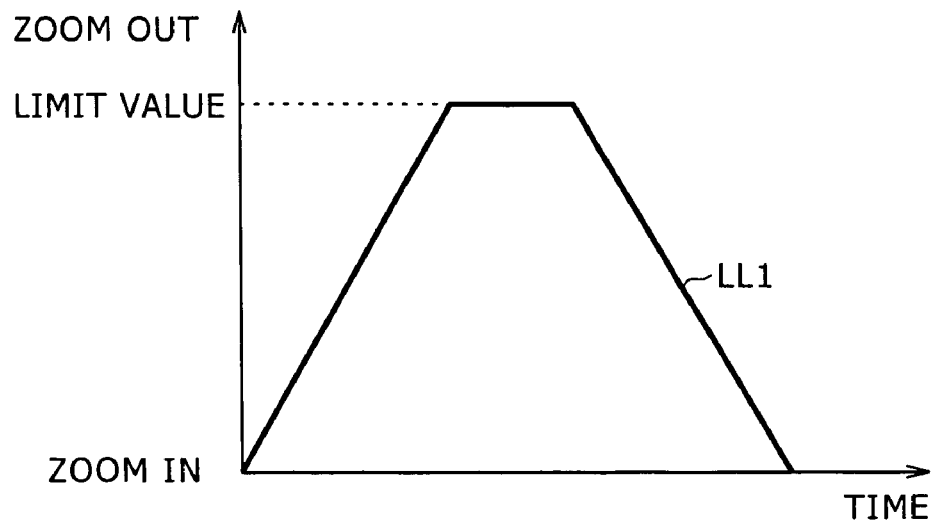
FIG. 5 is a characteristic curve diagram illustrating a case where scrolling is not instructed.

Thus, as a change in scale of a map display is shown in FIG. 5 indicated by a mark LL1, the controller 33 zooms out the map display to a limit value thereof according to an instruction for temporary zooming, and zooms in the map display to the original scale after passage of a prespecified period of time. In this processing sequence, the controller 33 provides controls so that screen images for the map display smoothly change when zooming out and zooming in. The controller 33 also executes processing of zooming out and zooming in so that the scale is changed linearly, namely, the scale is expressed by a linear function in which time is set as a parameter, thereby ensuring that a user does not feel odd about the changing map display when zoomed out and zoomed in.

On the other hand, when scrolling is instructed by a user upon zooming out as described above, processing of the controller 33 shifts from step SP5 to step SP13 upon receiving the result that it is determined in step SP5 that scrolling has been instructed by a user. Thus the controller 33 comletes zooming out, and scrolls a map display in response to an instruction by the user to shift to step SP10.

Figure 6:
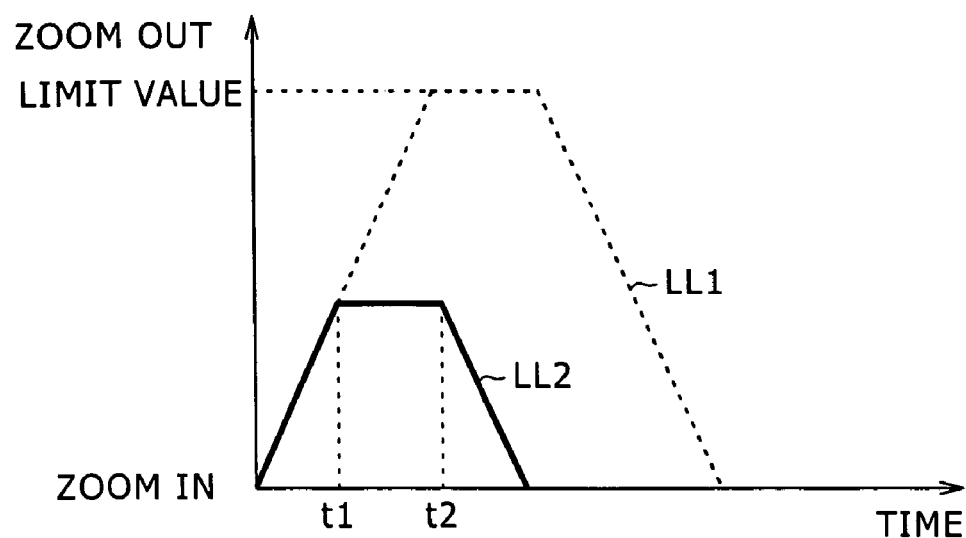
FIG. 6 is a characteristic curve illustrating a case when scrolling is instructed when zooming out.

Then, when scrolling is instructed by a user at the time point t1, as shown in FIG. 6 indicated by a mark LL2, in contrast to FIG. 5, the controller 33 stops zooming out, scrolls a map display in response to the instruction by a user, and, when the instruction of scrolling by a user is completed at the time point t2, zooms in the map display to the original scale.

When scrolling is instructed in the state where a map display is zoomed out according to a limit value thereof, the controller 33 scrolls the map display in response to the instruction by a user, and, when the instruction of scrolling by a user is completed, zooms in the map display to the original scale.

On the other hand, when scrolling is instructed by a user upon zooming in a map display to the original scale, processing of the controller 33 shifts from step SP11 to step SP14 upon receiving the result that it is determined in step SP11 that scrolling is instructed by a user, and scrolls the map display in response to the instruction by a user to shift to step SP12.

Figure 7:
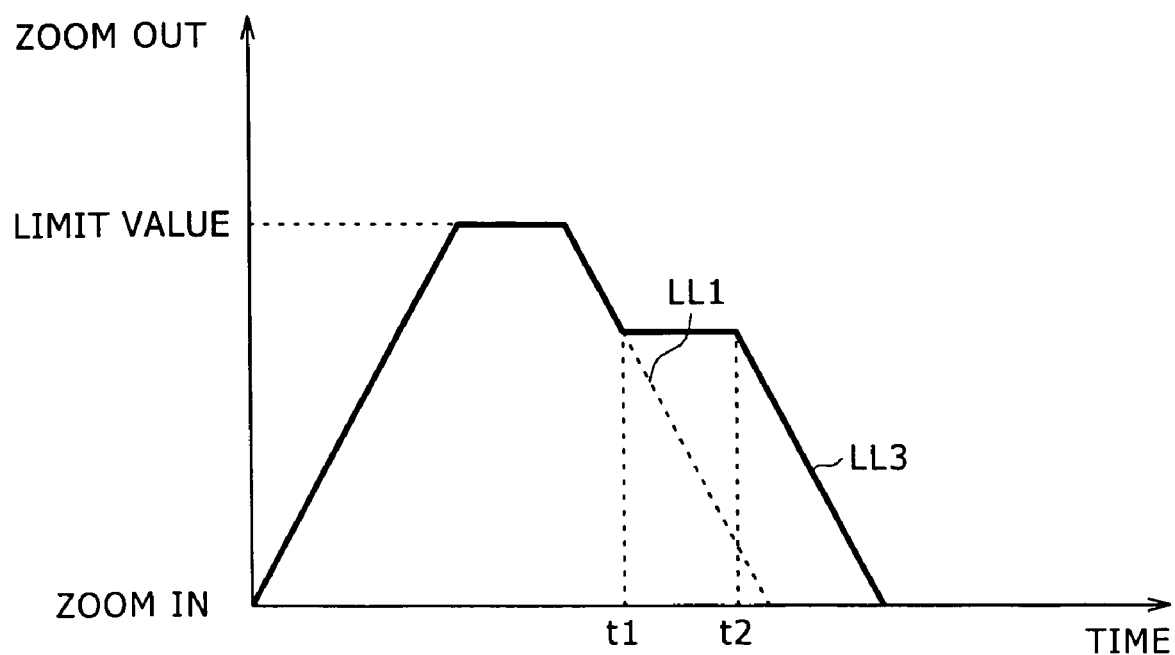

Thus, when scrolling is instructed by a user at the time point t1, as shown in FIG. 7 indicated by a mark LL3, in contrast to FIG. 5, the controller 33 temporally stops zooming in, scrolls a map display in response to the instruction by a user, and, when the instruction of scrolling by a user is completed at the time point t2, resumes zooming in to display the map with the original scale.

Figure 8:
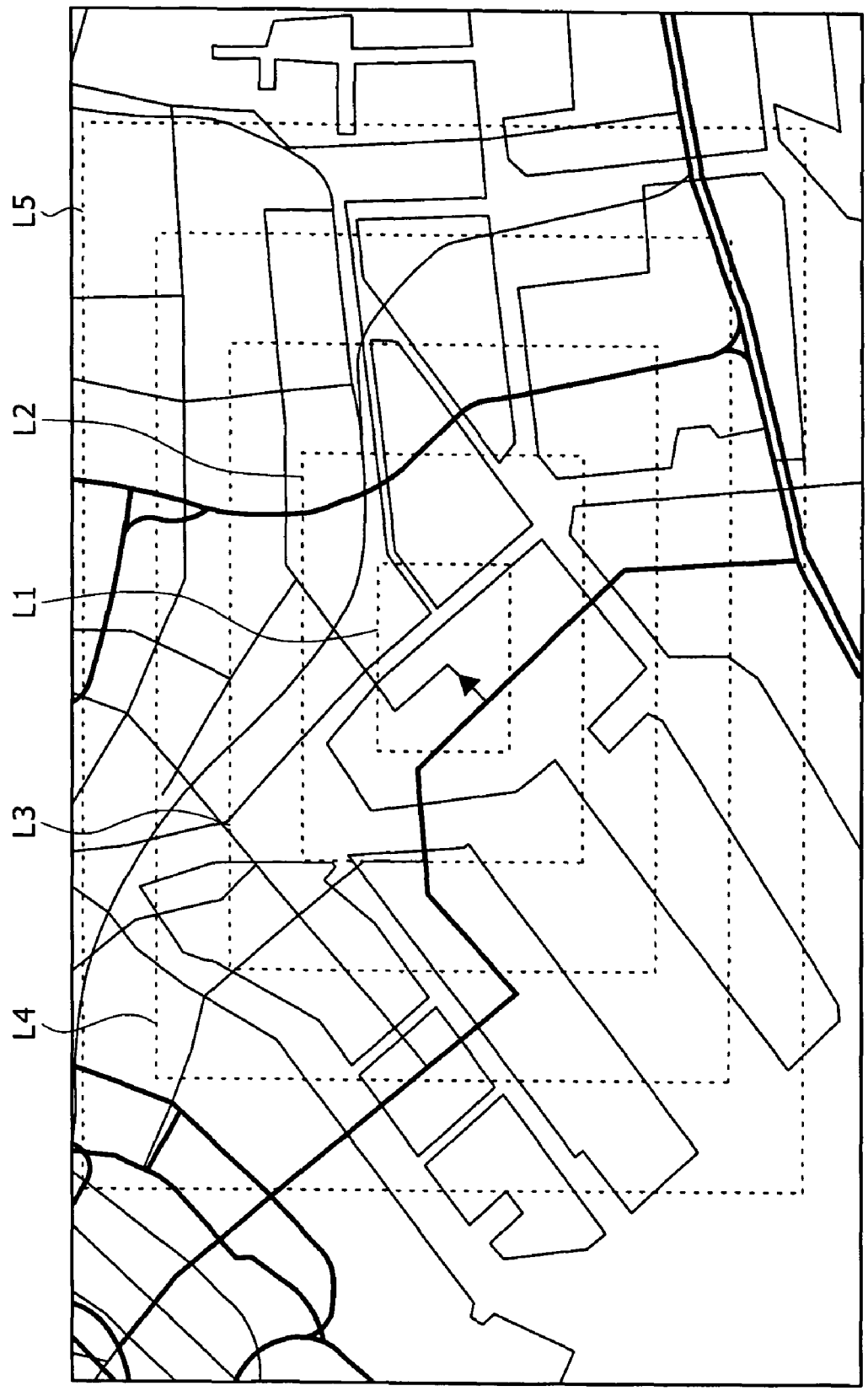
FIG. 8 is a flat diagram illustrating a map display with the characteristics shown in FIG. 5.

With the steps described above, the car navigation apparatus 1 zooms out a map display to a limit value thereof according to an instruction for temporary zooming, and zooms in, after passage of a prespecified period of time, the map display to the original scale, as a change in the area for the map display displayed by a display unit 37 is roughly shown in FIG. 8 indicated by marks L1 to L5.

Figure 9A:
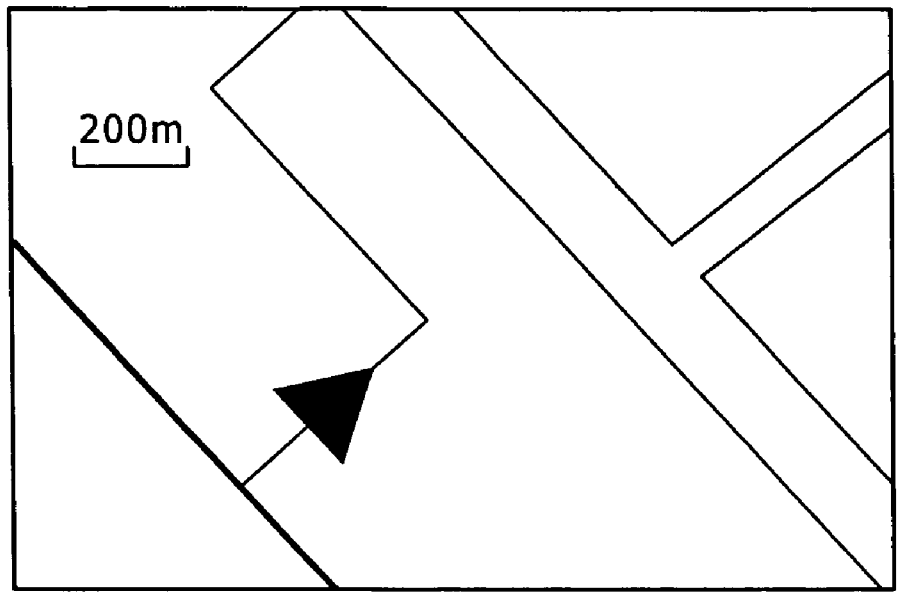
FIGS. 9A and 9B are flat views showing the map display when temporally zoomed.
Figure 9B:

Herein FIGS. 9A and 9B are display screens of the display unit 37 shown in contrast to FIG. 8; FIG. 9A is a flat view showing the map display before and after processing of temporary zooming as described above, while FIG. 9B is a flat view showing the map display zoomed out to the limit value thereof by the processing of temporary zooming. In these map displays, the controller 33 displays on a map a mark indicating an area having been displayed with the original scale. More specifically in this embodiment, when a scale of interest is equal to or less than a prespecified value in relation to the original scale, the controller 33 displays the area having been displayed with the original scale with doglegs on the four corners thereof, as shown in FIG. 9B. When the scale is further reduced, the area having been displayed with the original scale is displayed with a rectangular hatching, and, when the scale is still further reduced, the area having been displayed with the original scale is displayed with a cursor including line segments extended in the horizontal and vertical directions.

The controller 33 also creates a mark indicating a scale of a map each corresponding to the scales as described above on a display screen of the display unit 37. In the example shown in FIGS. 9A and 9B, the mark is displayed with a distance on a map display of interest.

(2) Operations in the Embodiment

With the configuration as described above, in the car navigation apparatus 1 (Refer to FIGS. 2 and 3), a map is displayed on the display section 37 in response to an instruction by a user, and the car navigation apparatus 1 guides the user with this map to the user's destination. The user can switch a scale of the map display to confirm the current position, and also can find a target facility by scrolling the map display and checking the peripheral area. If required, the user can search for a target facility or set a destination by repeating the operations for switching a scale of and scrolling the map display.

In relation to the operations performed by the user, in the car navigation apparatus 1, when the user specifies temporary zooming by operating the touch panel 39 or the remote commander 40, a scale of the map display is gradually lowered according to the user's instruction as a trigger under controls by the controller 33 to zoom out the map display, and after passage of a prespecified period of time, the map display is zoomed in to the original scale (Refer to FIGS. 1, 4, 5, and 8).

With the operations as described above, for instance, when a user wants to confirm a facility in a peripheral area around the current position, the map display is zoomed out and a wide area is temporally shown in the car navigation apparatus 1 simply by instructing temporally zooming out the map display, and therefore the user can confirm the target facility or the like with simple operations. Further because the zooming out is provided as a transitional display, the user can receive an instruction for car navigation, for instance, with the map display without intentionally returning the scale of the map display to the original one, and thus the user can confirm a facility or the like in the peripheral area with simple operations and then successively receive various types of information ordinarily provided by the car navigation apparatus 1.

Sometimes a user wants to temporally zoom out the map display for confirming a target facility and then check the area around the target facility more precisely.

To satisfy the user's needs as described above, the car navigation apparatus 1, when scrolling is instructed by a user during execution of the processing for temporally zooming the map display, the operation for zooming out or zooming in the map display is stopped and the map display is scrolled according to the user's instruction, and then the map display is zoomed in to the original scale (Refer to FIGS. 6 and 7). Because of the feature, the user can precisely confirm and check a map showing a target facility or the like during the processing for temporally zooming out the map display, while the map display is zoomed out and provided with a certain scale, and further during the processing for zooming in the map display, only by scrolling the map display so that the target position comes to a substantially central portion of the display screen.

Because of the features as described above, with the car navigation apparatus 1, the user can easily check a facility or the like in an area around the place currently being displayed with simple operations.

When the user instructs scrolling while the map display is temporally zoomed out, it is considered that the user finds a destination during the operation for zooming out and instructs scrolling, and in this case, the operation for scrolling is completed, and a scale of the map display is returned to the original scale for zooming in (Refer to FIG. 6).

In the case as described above, the time required for temporally zooming the map display can be minimized, and a detailed map of the place desired by the user can be displayed quickly, so that the convenience for use can be improved.

When the user instructs scrolling while the map display is zoomed out and being displayed with a certain scale, the map display can be zoomed in to the original scale by completing the operation for scrolling without the need for waiting passage of the display period.

Because of the feature, also in this case, the time required for temporally zooming the map display can be minimized, and a detailed map of the place desired by the user can be displayed quickly, so that the convenience for use can be improved.

On the other hand, when the user instructs scrolling during the operation for zooming in the map display, the operation for zooming in is suspended with the scroll processing executed, and then the operation for zooming in the map display is resumed to return a scale of the map display to the original scale. With the feature as described above, in a case where a user once has a destination displayed at a substantially central portion of the screen by scrolling, but the destination goes out or is going out of the screen due to excessive scroll, the user can confirm the destination and the like with the detailed map by again scrolling the display, which also contributes to improvement of the usability of the car navigation system.

(3) Effects and Advantages Provided in the Embodiment

With the configuration as described above, the car navigation apparatus 1 according to an embodiment of the present invention makes it possible to temporally zoom out a map display for displaying the map display with the original scale in response to an instruction by a user as a trigger, and enables confirmation of facilities and the like in an area around the place currently being displayed with simple operations by allowing an scrolling operation by the user during the operations for zooming out and in the map display.

In a case where the operation for zooming out the map display is once started and an instruction for scrolling is not provided via the input unit before the operation for zooming in the map display is finished, when the size of a display on the display unit comes to a limit value in association with the operation for zooming out the map display, the operation for zooming out the map display is suspended and then the scale of the map display is zoomed in to the original scale after passage of a prespecified period of time, and therefore when the user wants to confirm the area around the place currently being displayed, the user can check and confirm the peripheral area with simple operations only by giving a trigger, which ensures improvement of the usability.

In a case where the operation for zooming out a map display is started and scrolling is instructed with the input unit before the size of the display comes to the limit value, the scrolling operation is completed with the display zoomed in to the original size, so that the time required for an operation for temporally zooming out the map display can be minimized and a detailed map for a place desired by the user can be displayed, which also contributes to improvement of the usability.

In a case where, after the size of the map display comes to the limit value, scrolling is instructed with the input unit within a prespecified period of time, the time required to the operation for temporally zooming out the map display can be minimized and a place desired by the user can be displayed with the detailed map also by completing the scroll operation and zooming in the display on the display unit to the original size, which contributes to improvement of the usability.

With the present invention, a display as an object for scrolling is a map, and therefore when the present invention is applied to a map display or a car navigation apparatus, the usability can be improved.

Second Embodiment

A car navigation apparatus according to this embodiment of the present invention has the configuration as described with reference to FIGS. 2 and 3, and with the car navigation apparatus, an operation for zooming in a map display can be started during the processing to temporally zooming the map display by operating the remote commander 40 or the touch panel 39. The car navigation apparatus according to this embodiment has the same configuration as that of the car navigation apparatus 1 according to First Embodiment excluding the detailed points relating to the operation for zooming in performed during the operation for temporally zooming out, so that descriptions thereof are provided below by referring to the configurations shown in FIGS. 2 and 3 according to the necessity.

Because of the features as described above, in the car navigation apparatus 1 according to this embodiment, when the operation for zooming out a map display starts in response to an instruction for temporary zooming as a trigger and a scale of the display comes to the limit value, the controller 33 completes the operation for zooming out the map display. Further in the state when the map display is zoomed in as described above, or when the operation for zooming out the map display is finished and the map is displayed with a scale based on the limit value, if an zooming-in operation for temporary zooming is instructed by a user, the map display is zoomed in to the original scale in response to the instruction as a trigger.

When a user instructs scrolling during the operation for temporary zooming, the controller 33 executes the processing for scrolling as described in First Embodiment. In this case, if a user instructs scrolling after the map display is zoomed out and while the map is displayed with the scale based on the limit value, the map display is returned to the original scale with response to the completion of scrolling like in First Embodiment without waiting for an instruction by the user.

In this embodiment, by starting the operation for zooming in a map display in response to an instruction by a user as a trigger during the operation for temporary zooming, for instance, the processing for searching an area around the current position for a long time can be executed by reflecting the user's intention during the processing for zooming in the map display, which also contributes the usability.

Further in the case described above, when the user instructs scrolling while the map display is zoomed out and is being displayed with a scale based on the limit value, by completing the scroll processing and zooming in the display on the display unit to the original size, the time required for the operation for temporally zooming a map display can be minimized and a place desired by the user can be displayed with a detailed map, which contributes to improvement of the usability.

Third Embodiment

Figure 10:
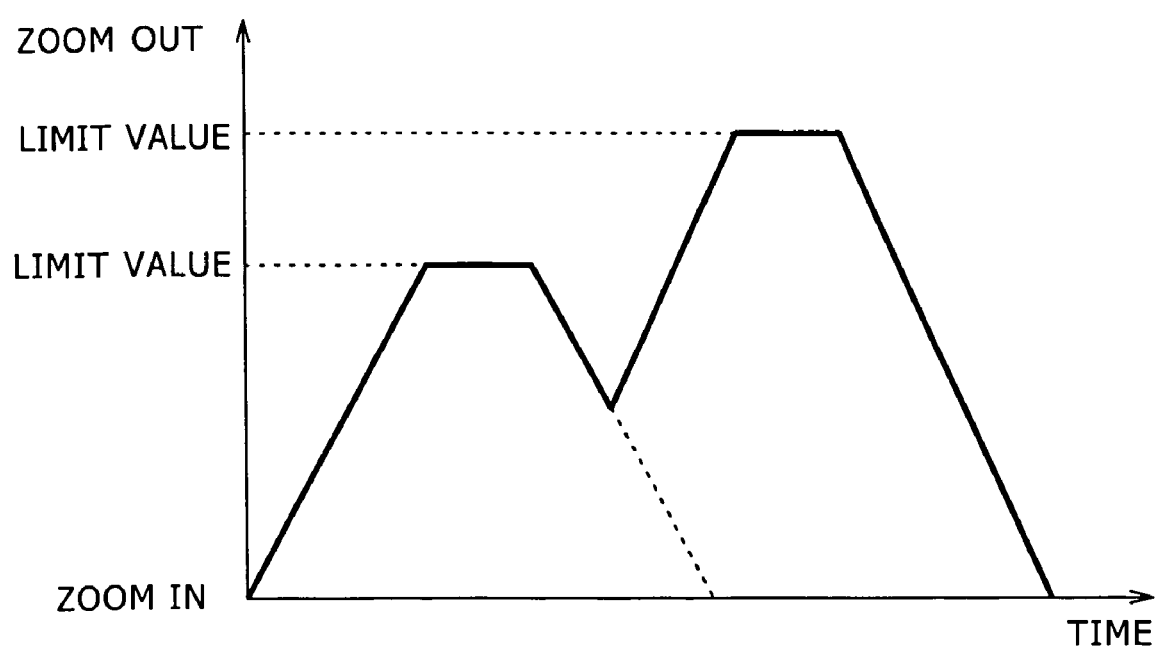
FIG. 10 is a characteristic curve according to another embodiment of the present invention.

In this embodiment, with the configuration according to First Embodiment as shown in FIG. 10, when temporary zooming is again instructed by a user during the processing sequence in which a map display is zoomed out according to an instruction for temporary zooming, the map display is displayed with a scale based on the limit value, and then the display is zoomed in to the original scale, the map display is again zoomed out to a scale based on the limit value corresponding to the current scale of the map display as a reference, and then the map display is zoomed in to the original scale after passage of a prespecified period of time. FIG. 10 shows a case in which a user instructs temporary zooming again during the operation for zooming in the map display.

Because of the features as described above, it is possible to zoom out a map display up to a desired scale for checking by repeatedly inputting a trigger for temporary zooming according to the necessity, and further the operation described above can be repeated until a desired destination is detected, so that the usability can be improved.

Fourth Embodiment

Descriptions of the embodiments above assume a case where an operation for zooming out a map is limited based on a limit value, but the present invention is not limited to this configuration, and the limit value is not always required to be provided.

Descriptions of the embodiments above assume a case where a scale for zooming out or zooming in is set by a linear function employing time as a parameter so that the scale is changed linearly, but the present invention is not limited to the configuration, and various functions such as a quadratic function or an exponential function may be employed in place of the linear function for changing a scale for zooming out or in the map display. Further time may be used as a parameter in place of a display scale for specifying the size of a display to set a change of a scale in zooming out or in the map display.

Descriptions of the embodiments above assume a case where the present invention is applied to an ordinary flat map display, but the present invention is not limited to this configuration, and may be applied to a map display having the so-called perspective form.

Descriptions of the embodiments above assume a case where the present invention is applied to a map display on a car navigation system, but the present invention is not limited to this configuration, and the present invention may be applied, for instance, to map displays in various types of apparatus such as those on a personal computer. Further in addition to the case where the map is displayed, the present invention may widely be applied to various cases including design drawings such as wiring diagrams, various types of images such as aerial photographs, and further to three-dimensional structures or displays in which a view point for a three-dimensional object is moved.

The present invention relates to a display apparatus, a display method, a display program, and a recording medium with the display program recorded therein, and can be applied to, for instance, a car navigation system.

The invention claimed is:

1. A display apparatus, comprising:
   display means for displaying at least a portion of a map;
   input means for accepting instructions provided by a user; and
   control means for controlling a display of the at least portion of a map on said display means such that said input means accepting an instruction for temporary zooming without scrolling triggers (i) automatic gradual zooming out of the display from its original scale on said display means that is carried out until the scale of the display on said display means reaches a first limit value and (ii) subsequent automatic gradual zooming in of the zoomed out display until the display is returned to the original scale,
   wherein in response to said input means accepting an instruction for scrolling after the automatic gradual zooming out is started but before the automatic gradual zooming in is completed, said control means stopping the gradual zooming out or the automatic gradual zooming in of the display and then scrolling of the display on said display means is carried out according to the instruction for scrolling.

2. The display apparatus according to claim 1, wherein upon no instruction for scrolling being provided by the user to said input means after said zooming out is started but before said zooming in is started and the scale of the display on said display means reaching the limit value during said zooming out, said control means automatically carries out said zooming in of the display after a specified period of time has elapsed after said zooming out reaches the limit value.

3. The display apparatus according to claim 2, wherein in response to the instruction for scrolling being provided by the user to said input means after the scale of the display on said display means reaches the limit value but before the specified period of time has elapsed, said control means scrolls the display on said display means according to said instruction for scrolling and then zooms in the display on said display means to the original scale after completion of the scrolling.

4. The display apparatus according to claim 2, wherein in response to the instruction for scrolling being provided by the user to said input means after the specified period of time has elapsed, said control means scrolls the display on said display means according to said instruction for scrolling and then zooms in the display on said display means to the original scale after completion of the scrolling.

5. The display apparatus according to claim 1, wherein said control means gradually zooms in the display on said display means to return the display to the original scale using the instruction for temporary zooming accepted by said input means as a trigger.

6. The display apparatus according to claim 5, wherein in response to the instruction for scrolling being accepted by said input means after said zooming out is completed, said control means scrolls the display on said display means according to said instruction for scrolling and then zooms in the display on said display means to the original scale after completion of the scrolling.

7. The display apparatus according to claim 1, further comprising: current position detecting means for detecting a current position on the map, wherein said control means executes processing of a route search from the detected current position to a destination set by the user using said input means and displays said map on said display means according to a route determined by processing a route search.

8. The display apparatus according to claim 1, wherein said input means accepting another instruction for temporary zooming without scrolling after the automatic gradual zooming in is started but before being completed, triggers (i) stopping the automatic gradual zooming in of the display, (ii) automatic gradual zooming out of the display that is carried out until the scale of the display on said display means surpasses the first limit value and reaches a second limit value, and (iii) subsequent automatic gradual zooming in of the zoomed out display until the display is returned to the original scale.

9. A display method for displaying at least a portion of a map, the method comprising:
   accepting instructions provided by a user; and
   controlling a display of said at least portion of a map such that accepting an instruction for temporary zooming without scrolling triggers (i) automatic gradual zooming out of the display from its original scale that is carried out until the scale of the display reaches a first limit value and (ii) subsequent automatic gradual zooming in of the zoomed out display until the display is returned to the original scale, and
   such that in response to accepting an instruction for scrolling after the automatic gradual zooming out is started but before the automatic gradual zooming in is finished,
   stopping the automatic gradual zooming out or the gradual zooming of the display, and
   then carrying out scrolling of the display according to the instruction for scrolling.

10. A recording medium having recorded thereon a computer-readable program for carrying out a method for displaying at least a portion of a map, said method comprising:
   accepting instructions provided by a user; and controlling a display of said at least portion of a map such that accepting an instruction for temporary zooming without scrolling triggers (i) automatic gradual zooming out of the display from its original scale that is carried out until the scale of the display on said display means reaches a first limit value and (ii) subsequent automatic gradual zooming in of the zoomed out display until the display is returned to the original scale, and such that in response to accepting an instruction for scrolling after the automatic gradual zooming out is started but before the automatic gradual zooming in is finished, stopping the automatic gradual zooming out or the gradual zooming in of the display, and then carrying out scrolling of the display according to the instruction for scrolling.

11. A display apparatus, comprising:

a display section that displays at least a portion of a map;

an input section that accepts instructions provided by a user; and a control section that controls a display of the at least portion of a map on said display section such that said input section accepting an instruction for temporary zooming without scrolling triggers (i) automatic gradual zooming out of the display from its original scale on said display section that is carried out until the scale of the display on said display section reaches a first limit value and (ii) subsequent automatic gradual zooming in of the zoomed out display until the display is returned to the original scale, wherein in response to said input section accepting an instruction for scrolling after the automatic gradual zooming out is started but before the automatic gradual zooming in is completed, said control section stopping the automatic gradual zooming out or the gradual zooming in of the display and then scrolling of the display on said display section is carried out according to the instruction for scrolling.

* * * * *